(12) United States Patent
Castelijns et al.

(10) Patent No.: US 8,155,764 B2
(45) Date of Patent: Apr. 10, 2012

(54) MULTIVARIABLE MODEL PREDICTIVE CONTROL FOR COALBED GAS PRODUCTION

(75) Inventors: Nicolas Antony Castelijns, Perth (AU); Giovanni Luca Colpo, Burnie (AU)

(73) Assignee: Honeywell International Inc., Morristown, NJ (US)

( * ) Notice: Subject to any disclaimer, the term of this patent is extended or adjusted under 35 U.S.C. 154(b) by 317 days.

(21) Appl. No.: 12/704,025

(22) Filed: Feb. 11, 2010

(65) Prior Publication Data

US 2010/0222911 A1    Sep. 2, 2010

Related U.S. Application Data

(60) Provisional application No. 61/156,257, filed on Feb. 27, 2009.

(51) Int. Cl.
G05B 13/02 (2006.01)
(52) U.S. Cl. ............... 700/44; 700/28; 700/29; 700/30; 700/31; 700/45; 703/2; 703/10
(58) Field of Classification Search ............. 700/28–31, 700/44–45; 703/2, 10
See application file for complete search history.

(56) References Cited

U.S. PATENT DOCUMENTS

| | | | |
|---|---|---|---|
| 5,740,033 A | | 4/1998 | Wassick et al. |
| 6,056,781 A * | | 5/2000 | Wassick et al. ............ 703/12 |
| 6,122,557 A * | | 9/2000 | Harrell et al. ............ 700/45 |
| 6,317,654 B1 * | | 11/2001 | Gleeson et al. ........... 700/272 |
| 6,654,649 B2 * | | 11/2003 | Treiber et al. ............ 700/31 |
| 6,721,609 B1 * | | 4/2004 | Wojsznis et al. .......... 700/28 |
| 7,050,863 B2 * | | 5/2006 | Mehta et al. ............. 700/29 |
| 7,092,863 B2 * | | 8/2006 | Goldman et al. .......... 703/13 |
| 7,627,461 B2 * | | 12/2009 | Guyaguler et al. ......... 705/4 |
| 7,856,281 B2 * | | 12/2010 | Thiele et al. ............ 700/32 |
| 7,946,127 B2 * | | 5/2011 | Fountain .............. 62/612 |
| 7,949,417 B2 * | | 5/2011 | Peterson et al. .......... 700/44 |
| 8,046,089 B2 * | | 10/2011 | Renfro et al. ........... 700/30 |
| 2004/0117766 A1 * | | 6/2004 | Mehta et al. ........... 717/121 |
| 2007/0265778 A1 * | | 11/2007 | Suter et al. ............ 702/1 |
| 2007/0276542 A1 * | | 11/2007 | Coward .............. 700/273 |
| 2008/0202159 A1 | | 8/2008 | Fountain |
| 2008/0307826 A1 * | | 12/2008 | Coward .............. 62/611 |

FOREIGN PATENT DOCUMENTS

| | | |
|---|---|---|
| EP | 0588594 | 3/1994 |
| WO | 9528666 | 10/1995 |

OTHER PUBLICATIONS

Ward—Control Microsystems (2005) "Coal Bed Methane Well Automation" 2005 International Coalbed Methane Symposium.

* cited by examiner

*Primary Examiner* — Ramesh Patel
(74) *Attorney, Agent, or Firm* — Jetter & Associates, P.A.

(57) ABSTRACT

A multivariable model predictive controller (MPC) for controlling a coalbed methane (CBM) production process. The MPC includes input ports for receiving a plurality of measurement signals including measured process parameters from CBM wells in a well field. A control loop includes a mathematical model that controls the CBM gas production. The model includes individual production characteristics for each CBM well that predicts its behavior for controlled variables (CVs) with respect to changes in manipulated variables (MVs) and disturbance variables (DVs). The control loop calculates future set points for the MVs based on the model and the measured process parameters for CBM production to achieve at least one control objective for the well field. A plurality of output ports provide control signals for implementing the future set points which when coupled to physical process equipment at the plurality of CBM wells control the physical equipment to reach the future set points.

18 Claims, 2 Drawing Sheets

MULTIVARIABLE MODEL PREDICTIVE CONTROL FOR COALBED GAS PRODUCTION

CROSS REFERENCE TO RELATED APPLICATIONS

This application claims the benefit of Provisional Application Ser. No. 61/156,257 entitled "MULTIVARIABLE PREDICTIVE CONTROL FOR COALBED GAS PRODUCTION", filed Feb. 27, 2009, which is herein incorporated by reference in its entirety.

FIELD

Disclosed embodiments relate generally to predictive controllers and methods for controlling coalbed gas collection from a well field comprising a plurality of wells.

BACKGROUND

A significant quantity of coalbed gas is physically bound (or sorbed) within coalbeds. This coalbed gas, believed to be formed during the conversion of vegetable material into coal, and comprises primarily methane ($CH_4$). Because it is primarily methane, coal gas is commonly termed coalbed methane (CBM) as it is referred to herein, although it is sometimes also referred to as Coal Seam Methane (CSM). Typically, more than 95% of the CBM is physically bound (adsorbed) onto the surface of the coalbed matrix. Such CBM can generally only be sold at a profit if the process efficiency is high enough and the costs to produce it are minimized.

However, methane production from CBM fields is known to be both technically and commercially challenging. After investing in the discovery and proving of CBM fields with commercially exploitable reserves, the enterprise must invest in, and then implement and operate a large number of wells that produce at significantly lower volumes than conventional gas wells. The number of wells in the well field could be as low as 50, but as high as several thousand. The enterprise must further implement and operate a plant, pipelines, and equipment and operational support resources to enable the extraction, gathering, compressing, water treatment, dehydration and treatment of the gas, and transportation and transfer (or other disposal) of the gas for sale. This assembly of plant equipment and naturally occurring reservoirs must be operated as a cohesive system of interconnected and interdependent parts. At least some of the system parts act in somewhat non-deterministic fashion, for example the extraction wells, thereby making the regulation of methane from CBM fields difficult.

Conventional control system software for operating CBM fields use low level (e.g. single variable) regulatory control solutions. Single variable control ties one control variable (e.g. temperature or pressure) to one manipulated variable (e.g. valve position or set point). Such control solutions do not have the ability to handle multiple constraints or to write to multiple manipulated variable set points from a single application. Single variable control also cannot coordinate the operation of the separate regulatory controls to achieve a global optimization objective.

SUMMARY

This Summary is provided to comply with 37 C.F.R. §1.73, presenting a summary of this Disclosure to briefly indicate the nature and substance disclosed herein. It is submitted with the understanding that it will not be used to interpret or limit the scope or meaning of the claims.

Disclosed embodiments describe multivariable model predictive controllers (MPC) for increasing the quantity, quality and rate of production of coalbed gases associated with subterranean formations, such as CBM. The application of multivariable MPC described herein to control a well field comprising a plurality of CBM wells is believed to be unique since multivariable MPC has not previously been applied to CBM gas gathering due in large part to operational complexity of the overall system.

More specifically, the Inventors have recognized that the operational complexity of CBM producing systems is largely due to the large number of degrees of freedom of the system and significant non-determinism. Multivariable MPCs according to disclosed embodiments simultaneously manipulate a set of independent variables of the CBM system (Manipulated Variables, or MVs, i.e. inputs) to maintain a set of dependent variables (Controlled Variables, or CVs, i.e. outputs) within constraints and/or targets (which can be entered and generally changed by the CBM operator) using a dynamic multivariable predictive process model.

The dynamic multivariable predictive model enables the control of the CBM process which represents the effects of moving a plurality of MVs on the CVs. The dynamic model generally coordinates movement of the MVs with a program to meet user input control and optimization objectives, where the objectives can be specified for both MVs and CVs. Using embodiments of the invention, a dynamic multivariable model is used to enhance the level of operational and commercial performance for the production of coalbed gases such as CBM by regularly (e.g. every minute) measuring, monitoring and calculating the optimal response and quickly adjusting a large number of MVs.

One disclosed embodiment comprises a multivariable MPC for controlling a CBM production process involving a CBM gas production system comprising a well field that includes a plurality of CBM wells. The multivariable MPC comprises a plurality of input ports for receiving a plurality of measurement signals that are indicative of measured process parameters including measured process parameters from the plurality of CBM wells. A control loop comprising an optimizer and a dynamic mathematical model controls the CBM gas production system, where the dynamic model includes individual production characteristics obtained for each of the plurality of CBM wells in the well field that predicts a behavior for a plurality of CVs with respect to changes in a plurality of MVs and disturbance variables (DVs) for the plurality of CBM wells.

The control loop calculates future set points for the plurality of MVs based on the dynamic mathematical model and the measured process parameters to result in the CBM production process achieving at least one control objective for the well field. The MPC includes a plurality of output ports for providing a plurality of control signals generated by the MPC for implementing the future set points, wherein the control signals when coupled to physical process equipment (e.g. field devices) at the plurality of CBM wells controls the physical equipment to reach the future set points.

In some embodiments disclosed multivariable MPCs are applied to CBM gas production networks that comprise a plurality of pipeline segments for coupling a plurality of CBM wells to at least one intermediate compressor, and from the intermediate compressor to at least one gas treatment plant. Applied to a CBM network, the plurality of control signals include at least one control signal for controlling a compressor set point for a compressor in the network. The control objective in this embodiment can comprise energy minimization in compression for the CBM gas production network.

DETAILED DESCRIPTION

Figure 1:
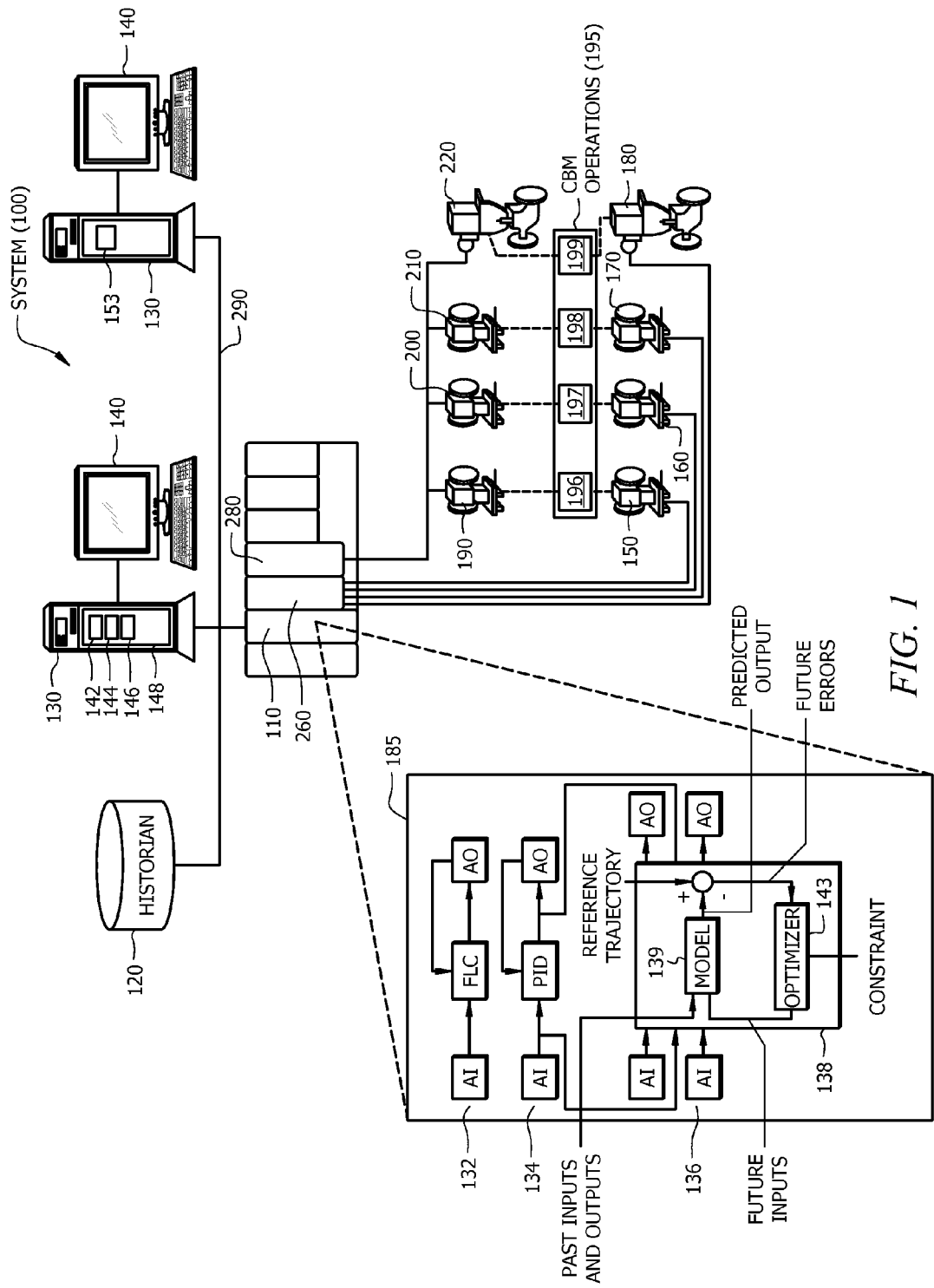
FIG. 1 shows a depiction of an exemplary controlled CBM production system according to a disclosed embodiment including a multivariable MPC communicatively connected to a data historian and to one or more host workstations or computers.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments describe multivariable MPCs that model and modulate a plurality of CBM process variables as described herein. Multivariable MPC control described herein can provide an essentially real-time, model-based control for a CBM well field comprising a plurality of CBM wells which can simultaneously assess a large number of constraints, predict future violations of constraints, and manipulate a large number of process set points.

Multivariable control is unlike traditional single-input, single-output (SISO) control that has been heretofore been applied to CBM systems. SISO systems provide fixed-pairings between one controlled variable and one manipulated variable. As described above, the reasons for relying on SISO control despite multivariable control generally being known since the 1970s include the infancy of the CBM industry and the operational complexity of the overall CBM system due to the large number of degrees of freedom of the system and significant non-determinism. For example, a typical CBM field can comprise several hundred wells spread over a large area. Although some individual wells may produce high purity methane, they also produce a considerable amount of water. Wellhead pressure is generally approximately only 3 Bar and individual well gas flow rates from well to well generally vary widely in the well field. It is normally needed to remove the water from the produced well fluids in some way. This may be accomplished by a preliminary water knock-out drum at each well head and/or by further water removal steps downstream.

Multivariable MPCs disclosed herein use measured data from the individual wells in the well field and optimize system operations based on one or more control objectives for the system as a whole. Thus, multiple inputs and multiple outputs (MIMO) control is provided, where interactions between inputs and outputs are explicitly characterized in the CBM process model and there are no discrete or fixed-pairings between inputs and outputs in the control structure. As a result, disclosed multivariable MPCs can dynamically select a combination of outputs in response to changing process conditions.

Disclosed MPCs can assist the operator(s) in control of the CBM gas production network by automatically checking for changes in CVs or DVs, and making preemptive, coordinated moves in the MVs to manipulate the wells and compressors in network applications. Exemplary CVs, can include intermediate compressor capacities, water handling at wellheads, water handling at other points in the network, temperature or pressure at various points in the network and the rate of change of gas flow at any supplier or part of the network. Other CVs can include gas inventory or linepack in the network, composition of gas at any part of the network, operational rules and guidelines relating to recent operations history of a well (e.g. amount of dewatering that has already occurred at a well), and operational rules or guidelines relating to recent gas flow performance of any well.

Process handles also known as MVs can include individual well flow rates (or choke valve positions), and in the case a CBM system including pipelines and one or more compressors, the compressor station set points (flow, pressure or direct speed control). DVs can include changes in plant demand, unexpected shutdown of any of the wells, change in local conditions or performance of any sub-section in the case of a network, and ambient conditions such as ambient temperature.

In another disclosed embodiment, an optimization strategy is described. The optimization can be executed in conjunction with the well control, such as on a minute-by-minute basis. This regular updating ensures the operation is continually being pushed towards its optimal operating position. For a computationally intensive optimization objective that may not be practical to run at a one-minute frequency, a higher level optimizer can be integrated. For example, this may convert the long term objective of maximum recoverable reserves into a shorter term relative prioritization of wells. Disclosed MPCs can pursue these short term objectives in real-time, but yield to any required control of constraints.

FIG. 1 shows a depiction of an exemplary controlled CBM production system 100 according to a disclosed embodiment including a multivariable MPC 110 communicatively connected to a data historian 120. The multivariable MPC 110 is generally a software application hosted on a computer, which is part of the controlled system 100. The multivariable MPC 110 is also communicatively connected to one or more host workstations or computers 130 (which may be any type of personal computers, workstations, etc.), each having a display screen 140.

The multivariable MPC 110 is also connected to field devices 150-220 that are positioned proximate to CBM operations 195 comprising a plurality of CBM wells 196-199 via input/output (I/O) cards 260 and 280. In one exemplary embodiment, the field devices 150-180 comprise choke valves that based on control signals provided by the multivariable MPC 110 via I/O card 260 control the CBM flow rate of the respective wells by changing the choke valve position, while field devices 190-220 can measure CBM flow rates from the respective wells and provide this information to multivariable MPC 110 via I/O card 280. The data historian 120 may generally be any desired type of data collection unit having any desired type of memory and any desired or known software, hardware or firmware for storing data and may be separate from (as illustrated in FIG. 1) or a part of one of the workstation/computer 130.

The multivariable MPC 110 is communicatively connected to the workstations/computers 130 and the data historian 120 via, for example, an Ethernet connection or any other desired communication network 290. The communication network 290 may be in the form of a local area network (LAN), a wide area network (WAN), a telecommunications network, etc. and may be implemented using hardwired or wireless technology.

As described above, the multivariable MPC 110 is communicatively connected to the field devices 150-220 using any desired hardware and software associated with, for example, standard 4-20 ma devices and/or any smart communication protocol. The field devices 150-220 may generally include a variety of device types, such as sensors, valves, transmitters, positioners, etc. while the I/O cards 260 and 280 may be any types of I/O devices conforming to any desired communication or controller protocol. The multivariable MPC 110, which may be one of many distributed controllers within the CBM system 100 having at least one processor therein, implements or oversees one or more process control routines, which may include control loops, stored therein or otherwise associated therewith.

The multivariable MPC also communicates with the field devices 150-220, the host workstations/computers 130 and the data historian 120 to control the CBM process in a desired manner. It should be noted that any control routines or elements described herein may have parts thereof implemented or executed by different controllers or other devices if so desired. Likewise, the control routines or elements described herein to be implemented within the CBM system 100 may take any form, including software, firmware, hardware, etc. For the purpose of this discussion, a process control element can be any part or portion of a process control system including, for example, a routine, a block or a module stored on any computer readable medium.

Control routines, which may be modules or any part of a control procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the multivariable MPC 110 may generally be configured to implement a control strategy or control routine in any desired manner.

In one embodiment, the multivariable MPC 110 implements a control strategy using what are commonly referred to as function blocks, wherein each function block is a part or object of an overall control routine and operates in conjunction with other function blocks (via communications called links) to implement process control loops within the CBM system 100. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the CBM system 100.

Function blocks may be stored in and executed by the multivariable MPC 110, which is typically the case when these function blocks are used for, or are associated with standard 4-20 ma devices and some types of smart field devices such as HART devices, or may be stored in and implemented by the field devices themselves, which may be the case with Fieldbus devices. While the description of the control system is provided herein using a function block control strategy which uses an object oriented programming paradigm, the control strategy or control loops or modules could also be implemented or designed using other conventions, such as ladder logic, sequential function charts, etc. or using any other desired programming language or paradigm.

As illustrated by the expanded block 185 of FIG. 1, the multivariable MPC 110 may include a plurality of single-loop control routines, illustrated as routines 132 and 134, and may implement one or more advanced control loops, illustrated as control loop 136. Each such loop is typically referred to as a control module. The single-loop control routines 132 and 134 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the system 100. The control loop 136 is illustrated including a control block 138 which itself includes a control lop having inputs communicatively connected to numerous AI function blocks and outputs communicatively connected to numerous AO function blocks, although the inputs and outputs of the control block 138 may be communicatively connected to any other desired function blocks or control elements to receive other types of inputs and to provide other types of control outputs.

As will be described further, the control block 138 integrates a multivariable MPC routine including a predictive model 139 with an optimizer 143 to perform optimized control for CBM system 100. The optimizer 143 is generally adapted to develop a set of target values for use by the MPC during each operational cycle of the process control system.

As illustrated in FIG. 1, one of the workstations 130 includes an advanced control block generation routine 148 that is used to create, download and implement the control loop 136. While the advanced control block generation routine 148 may be stored in a memory within the workstation 130 and executed by a processor therein, this routine (or any part thereof) may additionally or alternatively be stored in and executed by any other device within the CBM system 100, if so desired.

The advanced control block generation routine 148 can include a control block creation routine 142 that creates an control block as further described herein and that connects this control block into the process control system, a process modeling routine 144 that creates a process model for the process or a portion thereof based on data collected by the advanced control block, a control logic parameter creation routine 146 that creates control logic parameters for the control block from the process model and that stores or downloads these control logic parameters in the control block 138 for use in controlling the CBM process.

Disclosed embodiments may also be applied to an entire CBM production network. Typical CBM production networks comprise a well field comprising a plurality of CBM wells and a plurality of system elements, such as multiple pipeline segments, multiple intermediate compressors, and multiple gas treating plants that provide processing for the CBM gas before final delivery to end customers at the end of the pipeline.

Figure 2:
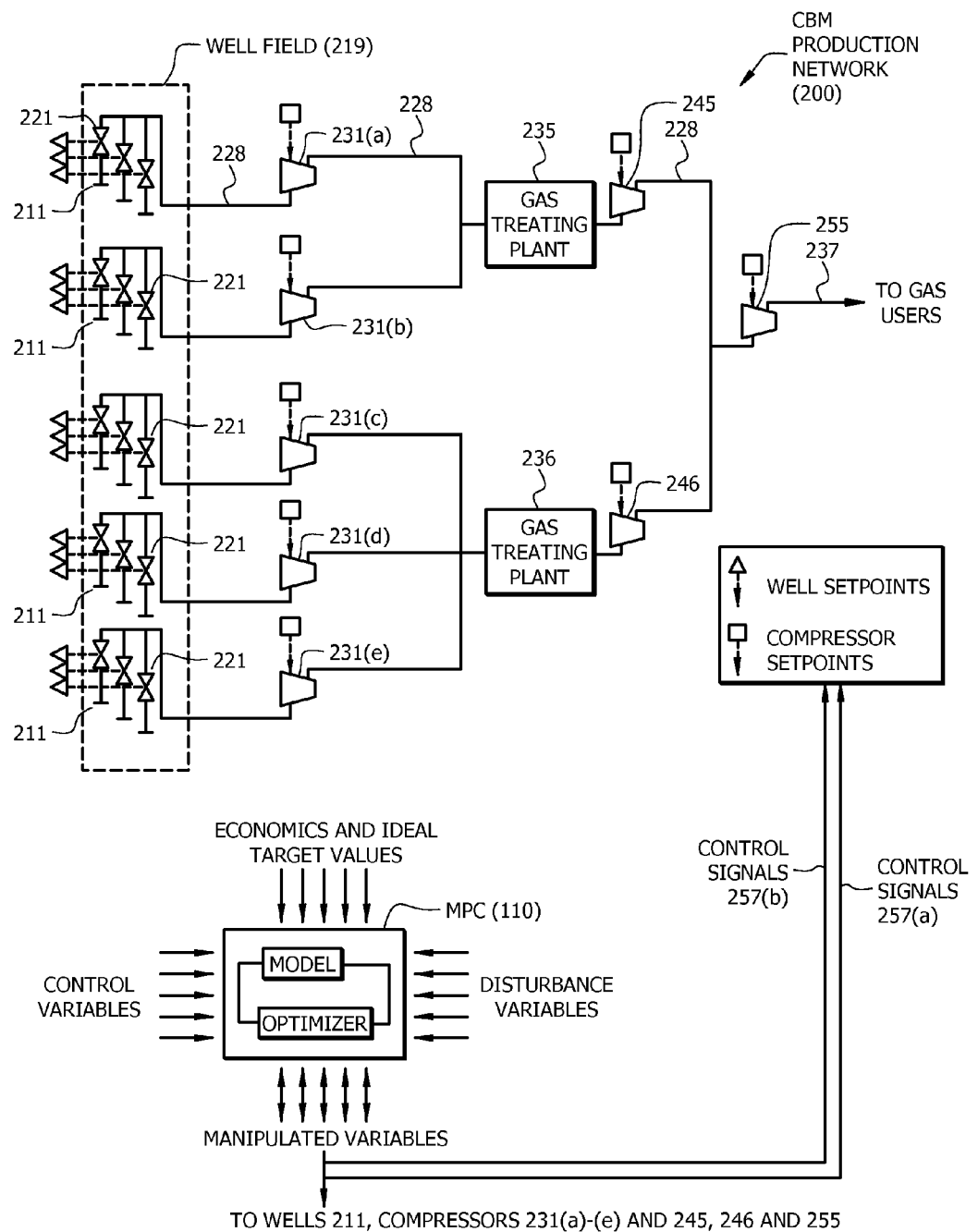
FIG. 2 shows a depiction of an exemplary CBM gas production network according to a disclosed embodiment including a multivariable MPC that controls wells in the well field as well as intermediate compressors and a plurality of CBM gas plants coming together.

FIG. 2 shows a depiction of an exemplary generalized CBM gas production network 200 according to a disclosed embodiment. CBM gas production network 200 comprises a multivariable MPC 110 that controls the position of choke valves 221 that regulate the CBM flow from each of a plurality of wells 211 in one or more well fields 219, as well as first intermediate compressors 231(a)-(e) at associated compression stations, and second intermediate compressors 245 and 246 at their respective compression stations that are downstream from gas treatment plants 235 and 236. Compressor 255 is at an associated compressor station where the CBM output from CBM gas plants 235 and 236 come together. Points in gas production network 200 where the multivariable MPC application writes (i.e. applies) control signals 257(a) to wells 211 to implement well set points and control signals 257(b) to compressors 231(a)-(e), 245, 246, and 255 to implement compressor set points determined by MPC 110 are indicated in FIG. 2.

The CBM well variables described (e.g. choke valve positions) above relative to system 100 shown in FIG. 1 are a part of multivariable MPC control for a gas production network. In contrast, multivariable MPC control in the CBM gas production network 200 shown in FIG. 2 is also applied to network elements. The actual multivariable MPC implementation may incorporate some or all of the additional elements shown in FIG. 2 as compared to FIG. 1. Since CBM fields are being developed using a number of different equipment configurations, the MPC solution described herein will generally be configured to respond to the particular configuration. Moreover, the process objectives may differ from operation to operation. For example, some operations may have a license to emit an effectively unlimited amount of water so as a result may not consider water management an objective, while others may have limitations in compression capability and will want to include maximization of compressor capacity as an objective.

Multivariable MPC 110 can be seen to be receiving a plurality of CV inputs, a plurality of DV inputs, a plurality of economics and target values, and measured data from a plurality of MVs. Multivariable MPC 110 can be seen to be sending a plurality of control signals for controller MVs, shown as control signals 257(a) to control well set points for wells 211 and control signals 257(b) for compressor set points for compressors 231(a)-(e), and 245, 246, and 255.

As shown in FIG. 2, CBM gas that is separated from water from wells 211 is piped via pipelines 228 to first intermediate compressors 231(a)-(e). A plurality of CBM gas streams are combined at each first intermediate compressor. Outlet streams from these first intermediate compressors 231(a)-(e) are then shown further combined at larger capacity second compressors 241-243 before being added to a major gas pipeline 237 to reach downstream gas users. Compressor 245 compresses gas from gas treatment plant 235, while compressor 246 compresses gas from gas treatment plant 246. Compressor 255 compresses gas received from compressors 245 and 246.

Regarding operating objectives and constraints for CBM production network 200, one generally applicable operating objective is to meet the gas demand of the downstream gas users. Due to the large number (e.g. hundreds or thousands) of wells 211 in the well field 219 all generally having significantly different gas output characteristics, given one or more objectives an optimal distribution of off-take from the respective wells 211 can be determined, including well selection (i.e. which wells to utilize at a given time) from the wells 211 in the well field 219.

Well selection can be divided into a plurality of different time frames, such as the three (3) different timeframes described below.

1. 1-minute to 1-day timeframe—the determination can be essentially a control exercise requiring secure closed loop control of the well head chokes, with feedback on active constraints in the piping network. Short term optimization objectives can be pursued when there are excess degrees of freedom.

2. 1-day to 3 month—this determination can be a planning exercise, integrating forecast plant demand, well availability and capability, and potentially maintenance information.

3. 1-month to 20 year—this determination can be a field development exercise, using specialized reservoir management software. A plan can be produced which maximizes recoverable reserves while meeting plant demands. Feedback can be included from actual well performance.

The sub-1 day timeframe can be considered real-time control. There are generally two key objectives at the real-time level, that being control and optimization as described below.

1. Control—A primary concern is often to manage the constraints of the gas production network on a minute-by-minute basis. Where there is a disturbance to a stable operating state, the gas production network can respond rapidly in a way which continues to respect constraints while meeting the final plant gas demand. This is a complex calculation due in large part to the large number of potential set points (MVs) to be manipulated.

Exemplary CVs can include:
i) Nodal compressor capacities
ii) Regional compressor capacities
iii) Water handling at wellheads
iv) Water handling at other points in the network such as gas treatment plants
v) Temperature or pressure at various points in the network
vi) Rate of change of any supplier or part of the network Exemplary MVs for use in network 200 can include individual well flow rates (or choke valve positions) and compressor station set points (e.g. flow, pressure or direct speed control). Exemplary DVs can include changes in plant demand, unexpected shutdown of any of the gas sources (e.g. wells 211), change in local conditions or the performance of any subsection of the network 200, or a change in ambient temperature.

Regarding optimization, if the final gas demand from gas users is stable, an opportunity may exist to rebalance the gas supply from the wells 211 in a more optimal way. Several potential optimization objectives can be implemented, such as maximization of recoverable reserves, full utilization of the water handling capability or rebalance suppliers to minimize total compressor fuel gas consumption.

In operation, the primary objective for multivariable MPC 110 can be to assist the network operator(s) in control of the gas production network 200. The multivariable MPC 110 checks for changes in constraints or disturbances, and makes preemptive, coordinated moves to manipulate the operating parameters for both the CBM wells 211 and compressors 231(a)-(e), 245, 246, and 255. Such preemptive, coordinated moves can be particularly useful in dynamic situations such as start up of new segments of the production network or significant changes in demand from the gas users.

The optimization can be executed in conjunction with the well control, on a minute-by-minute basis. This ensures the operation is continually being pushed towards its optimal operating position. For a computationally intensive optimization objective that may not be practical to run at a one-minute frequency, a higher level optimizer could be integrated. For example, this may convert the long term objective of maximum recoverable reserves into a shorter term relative prioritization of wells. Disclosed multivariable MPC can pursue these short term objectives in real-time, but yield to any required control of constraints.

Regarding exemplary controller variables for a CBM gas production network, MVs can include:

1. Individual Well Flow Rates:

The flow rate of CBM gas from individual wells is often the key contributor to constraints throughout the downstream system. Increasing the gas flow rate from a well places more load on equipment downstream of the well. This includes intermediate compressor stations and gas treating plants (e.g. glycol treatment capacity). Where a downstream piece of equipment becomes limiting (i.e. a compressor reaches capacity constraints), the multivariable MPC can decrease the flow rate of gas from wells which contribute to that compressors load. In this way, gas production can be shifted between different parts of the field such that total production capacity of the network is more fully utilized.

Manipulation of individual well flow rates also affects the total gas production from the network. This allows the application to respond to dynamic changes in gas demand from the end user. The method of adjusting the flow rate of gas from the well is dependent on the regulatory control scheme in place on the well. It may be achieved by the MPC application directly writing to the set point of a regulatory flow control, or it may be indirectly achieved by the MPC writing to a choke valve position or pressure controller which then influences the gas flow from the well. Adjusting well flow rates also allows a preferred production plan, or well prioritization, to be achieved. The MPC can store a list of preferred well priorities. When total gas production is constrained by end-user demand, the lowest priority wells can be closed in.

2. Individual Well Water Levels:

For some types of CBM wells, water is pumped from the well bore. This pumping rate may be under level control. In this case, the level controller set point or rate of water draw may be manipulated by the MPC application. Adjusting the water level in the well affects water production rate and potentially gas production rate.

3. Compressor Station Set Points (e.g. Flow, Pressure or Direct Speed Control):

Multiple compressor stations can be manipulated to set flow and pressure in the gas production network 200. The MPC application may write to a flow, pressure or direct speed control for the compressor. Requesting more flow, or a lower suction pressure, or a higher discharge pressure, or a higher speed, are all set point changes which will tend to load the compressor, pushing it closer to ultimate capacity constraints. Manipulating the compressor load will also affect the efficiency of the machine.

By selecting appropriate compressor set points through the network (be they flow, pressure or speed), the efficiency of the overall compressor network may be optimized. Additionally, the total production capacity of the network may be maximized by ensuring all compressors are pushed to their individual capacity constraints. Other constraints within the network may occur, such as maximum pressure or flow at particular points before individual compressor reach capacity constraints. These constraints may be managed by adjusting compressor station set points. For example, high flow demands in a particular segment of the network may cause the pressure at a certain point in the pipeline to approach maximum operating pressure. The MPC application will manipulate compressor set points and/or well flows to reduce flow from that segment, and replace it with flow from a different segment of the network which is unconstrained.

The multivariable MPC application is generally built using computer-based software tools. Items which are generally defined during controller configuration are the lists of controller input and outputs, and the dynamic relationships between the independent operating handles (MVs and/or disturbance variables DVs), and the constraints (CVs). Exemplary steps for implementing multivariable controllers according to disclosed embodiments include:

1. Assemble and study of process flow diagrams (PFD), Process and Instrumentation Diagrams (P&ID), and other documents describing the physical, compositional and instrumented characteristics of the CBM system.

2. Determine the goals the system owner's desire for the economic, regulatory, safety and reliability aspects of system operations.

3. Determine characteristics of the multivariable MPC to be applied. Such multivariable controllers are generally commercially available as computer programs that can be loaded or interfaced to Process Control Systems or to computers that are interfaced to Process Control Systems.

4. Select the variables that are to be the CVs, DVs and MVs, such as described above.

5. Configure the multivariable MPC as per product instructions.

6. Implement the controller in the target CBM system or network.

7. Perform tests to confirm proper operation. Test are generally actual field tests, but may also include simulations.

8. Review test results, correct defects and fine-tune the configuration of the multivariable MPC.

Although disclosed embodiments have been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A multivariable model predictive controller (MPC) for controlling a coalbed methane (CBM) production process involving a CBM well field that includes a plurality of CBM wells, said multivariable MPC comprising:
   a plurality of input ports for receiving a plurality of measurement signals that are indicative of measured process parameters including measured process parameters from said plurality of CBM wells;
   a control loop comprising an optimizer and a dynamic mathematical model for controlling said CBM gas production system, said dynamic model including individual production characteristics obtained for each of said plurality of CBM wells that predicts a behavior for a plurality of controlled variables (CVs) with respect to changes in a plurality of manipulated variables (MVs) and disturbance variables (DVs) for said plurality of CBM wells, wherein said control loop calculates future set points for said plurality of MVs based on said dynamic mathematical model and said measured process parameters to result in said CBM production process achieving at least one control objective for said CBM well field, and
   a plurality of output ports for providing a plurality of control signals generated by said MPC for implementing said future set points, wherein said control signals when coupled to physical process equipment at said plurality of CBM wells controls said physical equipment to reach said future set points.

2. The multivariable MPC of claim 1, wherein said individual production characteristics comprise a water level, pump constraints and a CBM production rate.

3. The multivariable MPC of claim 1, wherein said control objective comprises a maximum total water production rate limit for said plurality of CBM wells, and wherein said control signals select respective ones of said plurality of CBM wells for said CBM production to keep a total water production rate below said maximum total water production rate limit.

4. The multivariable MPC of claim 1, wherein said CBM well field is part of a CBM gas production network comprising a plurality of pipeline segments for coupling said plurality of CBM wells to at least one intermediate compressor, and said at least one intermediate compressor to at least one gas treatment plant, and wherein said plurality of control signals includes at least one control signal for controlling a compressor set point for said intermediate compressor.

5. The multivariable MPC of claim 4, wherein said at least one intermediate compressor comprises a plurality of intermediate compressors and said at least one gas treatment plant comprises a plurality of gas treatment plants.

6. The multivariable MPC of claim 4, wherein said control objective comprises energy minimization in compression for said CBM gas production network.

7. A coalbed methane (CBM) production system, comprising:
   a CBM well field that includes a plurality of CBM wells, and
   a multivariable model predictive controller (MPC) for controlling a CBM production process involving said plurality of CBM wells, said MPC comprising:
      a plurality of input ports for receiving a plurality of measurement signals that are indicative of measured process parameters including measured process parameters from said plurality of CBM wells;
      a control loop comprising an optimizer and a dynamic mathematical model for controlling said CBM gas production system, said dynamic model including individual production characteristics obtained for each of said plurality of CBM wells that predicts a behavior for a plurality of controlled variables (CVs) with respect to changes in a plurality of manipulated variables (MVs) and disturbance variables (DVs) for said plurality of CBM wells, said control loop calculating future set points for said plurality of MVs based on said dynamic mathematical model and said measured process parameters to result in said CBM production process achieving at least one control objective for said CBM well field, and
      a plurality of output ports for providing a plurality of control signals generated by said MPC for implementing said future set points, wherein said control signals when coupled to physical process equipment at said plurality of CBM wells controls said physical equipment to reach said future set points.

8. The system of claim 7, wherein said individual production characteristics comprise a water level, pump constraints and a CBM production rate.

9. The system of claim 7, wherein said control objective comprises a maximum total water production rate limit for said plurality of CBM wells, and wherein said control signals select respective ones of said plurality of CBM wells for said CBM production to keep a total water production rate below said maximum total water production rate limit.

10. The system of claim 7, wherein said CBM well field is part of a CBM gas production network comprising a plurality of pipeline segments for coupling said plurality of CBM wells to at least one intermediate compressor, and said at least one intermediate compressor to at least one gas treatment plant, and wherein said plurality of control signals includes at least one control signal for controlling a compressor set point for said intermediate compressor.

11. The system of claim 10, wherein said at least one intermediate compressor comprises a plurality of intermediate compressors and said at least one gas treatment plant comprises a plurality of gas treatment plants.

12. The system of claim 10, wherein said control objective comprises energy minimization in compression for said CBM gas production network.

13. A method of controlling coalbed methane (CBM) production process obtained from a CBM well field comprising plurality of CBM wells, said method comprising:
   receiving a plurality of measurement signals that are indicative of measured process parameters including measured process parameters from said plurality of CBM wells;
   using multivariable model predictive controller (MPC) comprising a control loop including an optimizer and a dynamic mathematical model for controlling said CBM production process, said dynamic model including individual production characteristics obtained for each of said plurality of CBM wells that predicts a behavior for a plurality of controlled variables (CVs) with respect to changes in a plurality of manipulated variables (MVs) and disturbance variables (DVs) for said plurality of CBM wells, said control loop calculating future set points for said plurality of MVs based on said dynamic mathematical model and said measured process parameters to result in said CBM production process achieving at least one control objective for said CBM well field, and providing a plurality of control signals generated by said MPC for implementing said future set points, and coupling said control signals to physical process equipment at said plurality of CBM wells to control said physical equipment to reach said future set points.

14. The method of claim 13, wherein said individual production characteristics comprise a water level, pump constraints and a CBM production rate.

15. The method of claim 13, wherein said control objective comprises a maximum total water production rate limit for said plurality of CBM wells, and wherein said control signals select respective ones of said plurality of CBM wells for said CBM production to keep a total water production rate below said maximum total water production rate limit.

16. The method of claim 13, wherein said CBM well field is part of a CBM gas production network comprising a plurality of pipeline segments for coupling said plurality of CBM wells to at least one intermediate compressor, and said at least one intermediate compressor to at least one gas treatment plant, and wherein said plurality of control signals includes at least one control signal for controlling a compressor set point for said intermediate compressor.

17. The method of claim 16, wherein said at least one intermediate compressor comprises a plurality of intermediate compressors and said at least one gas treatment plant comprises a plurality of gas treatment plants.

18. The method of claim 16, wherein said control objective comprises energy minimization in compression for said CBM gas production network.

* * * * *